United States Patent [19]

Zahner

[11] 3,977,117

[45] Aug. 31, 1976

[54] FISHING ROD HOLDER AND HOOK SETTER APPARATUS

[76] Inventor: Marvin L. Zahner, 421 N. Osage Drive, Skiatook, Okla. 74070

[22] Filed: Jan. 14, 1975

[21] Appl. No.: 540,844

[52] U.S. Cl. ................................................ 43/15
[51] Int. Cl.² ..................................... A01K 97/10
[58] Field of Search ................... 43/15, 16, 25, 19

[56] References Cited
UNITED STATES PATENTS

| | | | |
|---|---|---|---|
| 765,433 | 7/1904 | Mangelsdorff | 43/15 |
| 2,642,690 | 6/1953 | Soenksen | 43/15 |
| 2,744,351 | 5/1956 | Smith | 43/16 |
| 2,783,574 | 3/1957 | Bayes | 43/16 |
| 3,154,875 | 11/1964 | Biddison | 43/15 |
| 3,897,646 | 8/1975 | Sheets | 43/15 |

*Primary Examiner*—Warner H. Camp
*Attorney, Agent, or Firm*—Head, Johnson & Chafin

[57] ABSTRACT

A combination fishing rod holder and fish hook setter apparatus comprising a rod holder having a trigger mechanism for releasably securing the rod holder in a predetermined or preselected position for holding a fishing rod, adjustable dual torsion spring means for supporting the rod holder whereby a predetermined pressure is transmitted to the rod holder upon release of the trigger mechanism, fish line receiving means carried by the trigger mechanism for receiving the fish line therearound, adjustable tension spring means engagable with the fish line receiving means for adjusting the pressure required on the fish line for releasing the trigger mechanism to set the fish hook, adjustable stop means for limiting the movement of the rod holder in one direction upon release of the trigger mechanism, and means for supporting the apparatus in a stable position during use thereof.

5 Claims, 4 Drawing Figures

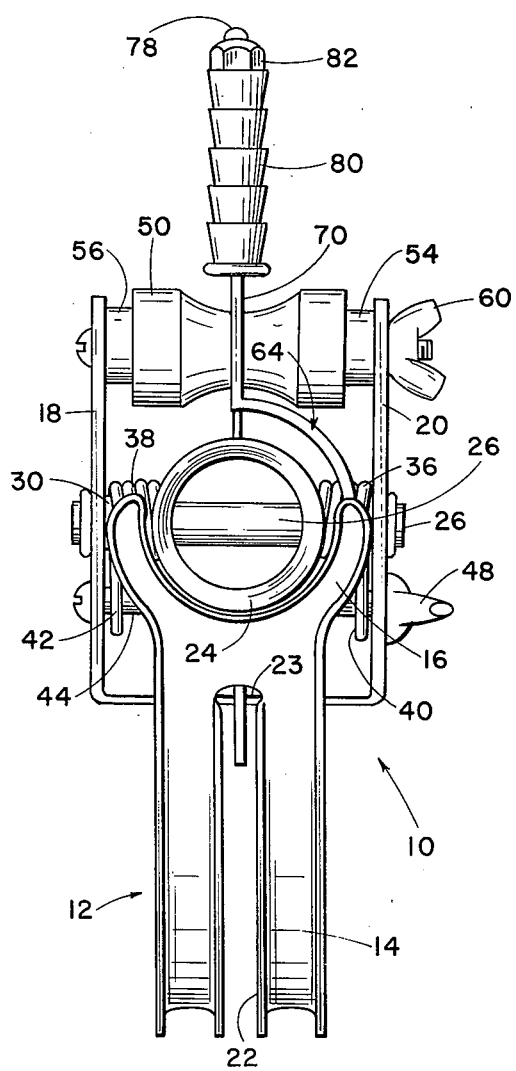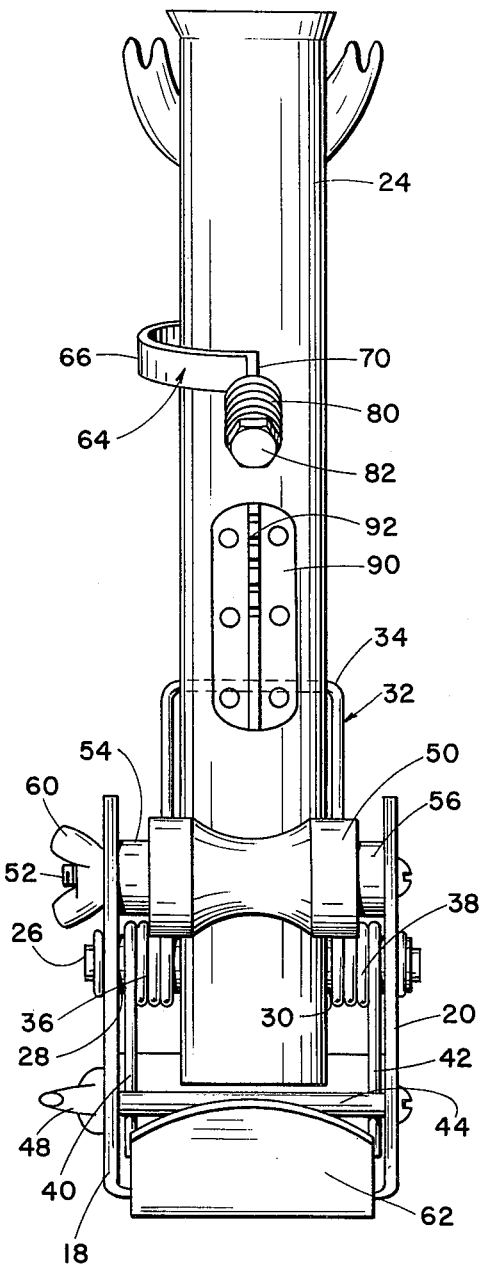
Fig. 3
Fig. 4

3,977,117

FISHING ROD HOLDER AND HOOK SETTER APPARATUS

BACKGROUND OF THE INVENTION

1. Field of the Invention

This invention relates to the improvements in fishing apparatus and more particularly, but not by way of limitation, to a combination fishing rod holder and fish hook setter apparatus.

2. Description of the Prior Art

There are many devices available today for supporting a fishing rod without constant attendance by the fisherman, said devices being provided with spring mechanisms or pressure sensitive devices for "jerking" the rod when a fish bites in order to set the fish hook in the mouth of the fish. However, these devices are usually either of a complicated structure which renders the use thereof inefficient and difficult, or do not have any means for adjusting the pressures or forces under which the various elements thereof react. As a result, the rod holder devices usually cannot be effectively utilized with both relatively large fishes and relatively small fishes since many smaller fishes require a delicate hook setting action and many larger fishes require a more forceful hook setting action.

SUMMARY OF THE INVENTION

The present invention contemplates a novel fishing rod holder and fish hook setter apparatus which is particularly designed and constructed for overcoming the above disadvantages. The novel apparatus comprises a support frame having a tubular rod holder pivotally secured thereto for receiving one end of a fishing rod therein. A trigger mechanism is carried by the rod holder and is releasably engagable with the support frame for locking the rod holder in a rod supporting position for fishing. An adjustable spring-cradle member or dual torsion spring is secured to the support frame for receiving the rod holder therein and applying a predetermined pressure on the holder against the force of the trigger mechanism in order to pivot the rod holder in one direction upon release of the trigger mechanism thus setting the hook in the mouth of the fish. A fish line receiving element is carried by the trigger mechanism for receiving the fish line therearound, and is responsive to any pressure on the line when a fish "bites" in order to release the trigger mechanism. An adjustable spring urged pressure device is operably connected between the line receiving element and the rod holder for adjusting the pressure required for the release of the trigger mechanism. In addition, an adjustable stop means is secured to the support frame for limiting the movement of the rod holder in one direction upon release of the trigger mechanism. It is also desirable to provide a plurality of brackets, or the like, which may be adjustably secured to the support frame for securing the apparatus to a variety of stable support members, such as the ground, a portion of the boat structure, or the like, during use of the apparatus for catching fish.

BRIEF DESCRIPTION OF THE DRAWINGS

FIG. 3 is front elevational view of a combined fishing rod holder and fish hook setter apparatus embodying the invention, and depicted in the latched position thereof.

FIG. 4 is a rear elevational view of a combined fishing rod holder and fish hook setter apparatus embodying the invention, and depicted in the released position thereof.

DESCRIPTION OF THE PREFERRED EMBODIMENT

Figure 1:
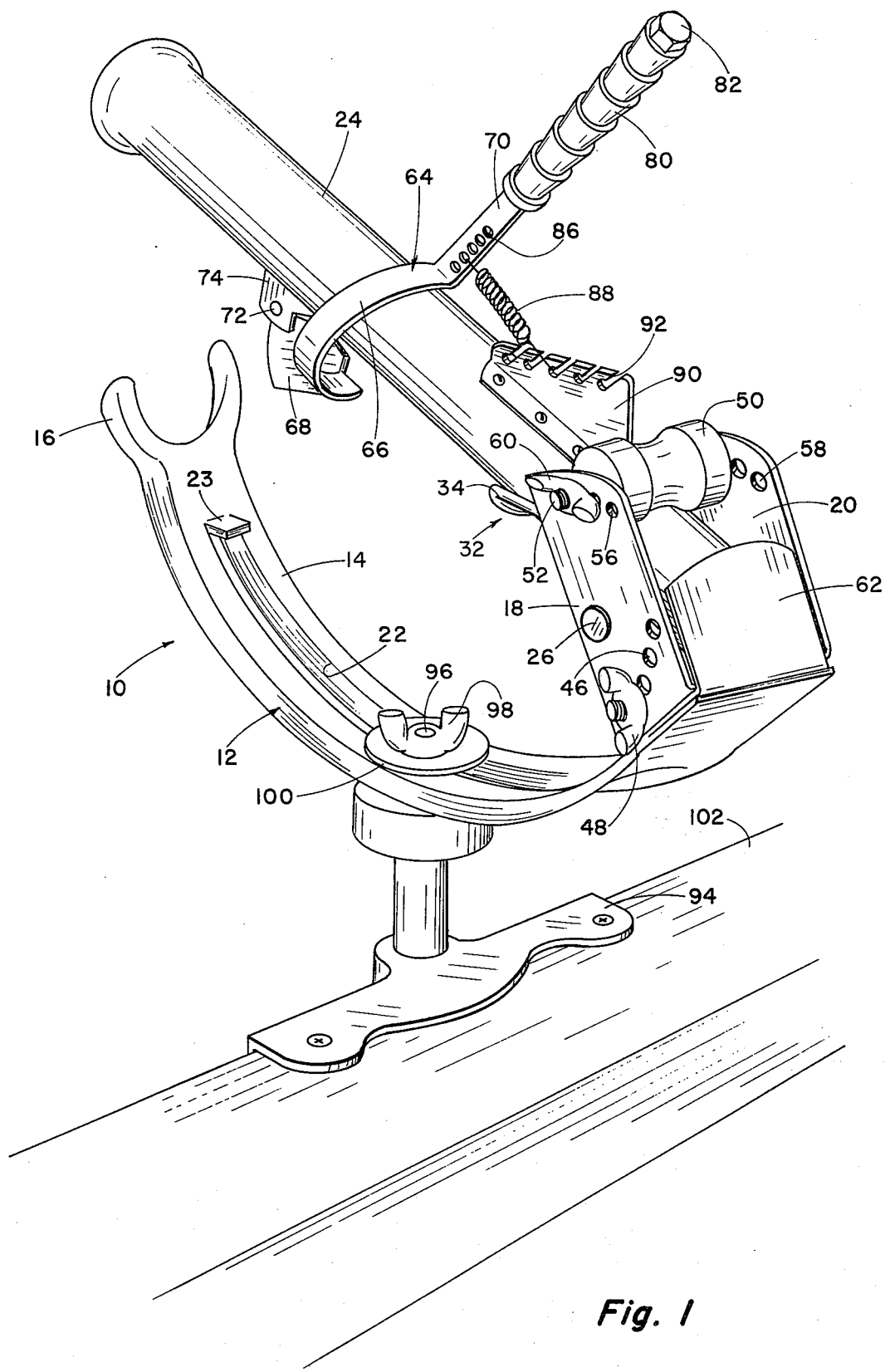
FIG. 1 is a perspective view of a combined fishing rod holder and fish hook setter apparatus embodying the invention, and depicted secured to the gunnel of a boat.

Referring to the drawings in detail, reference character 10 generally indicates a combined fishing rod holder and fish hook setter apparatus comprising a support frame 12 having an arcuate arm member 14 provided with a yoke member 16 at one end thereof and a pair of spaced brackets 18 and 20 at the opposite end thereof. A centrally disposed elongated slot 22 is provided in the arcuate arm 14 and extends longitudinally therealong for facilitating securing of the apparatus 10 for stability during use thereof, and an angularly extending lip or sear member 23 is provided at one end of the slot 22 in the proximity of the yoke member 16 for a purpose as will be hereinafter set forth. A sleeve or tube member 24 has one end thereof pivotally secured between the brackets 18 and 20 by a trunion pin 26 and is centrally disposed between the brackets 18 and 20 by a pair of spaced sleeves 28 and 30 disposed around the pin 26 on opposite sides of the tube 24. The tube 24 is preferably open at the opposite ends thereof for receiving one end of the fishing rod 27 therein (FIG. 2), and the trunion pin 26 passed diametrically through the tube 24, as particularly shown in FIG. 3 to provide a stop to limit the depth of insertion of the fishing rod 27 therein, as will be hereinafter set forth.

A tube support dual torsion spring apparatus generally indicated at 32 is provided for supporting the tube 24 and applying a preselected pressure or force thereagainst. The dual torsion spring apparatus 32 comprises a central cradle portion 34 for receiving the tube 24 therein, and the opposite ends thereof terminate in coil or torsion springs 36 and 38 disposed around the spaced sleeves 28 and 30, respectively, on the opposite sides of the tube 24. Each coil 36 and 38 terminates in an outwardly extending spring end 40 and 42, respectively, each of which engage a cross rod member 44 extending between the brackets 18 and 20. The bracket 18 is provided with a plurality of spaced apertures 46 in substantial alignment with a plurality of similar spaced apertures (not shown) provided in the bracket 20. The rod 44 may be inserted through a preselected aperture 46 and the corresponding aligned aperture and removably secured therein by a suitable wing nut 48, or the like. The position of the rod 44 and the engagement of the spring ends 40 and 42 thereagainst determine the tension or pressure of the cradle element 34 against the tube 24 for a purpose as will be hereinafter set forth.

A resilient stop member 50 of any suitable configuration is secured between the bracket members 18 and 20 by a cross rod 52, and is centrally secured therebetween by a pair of suitable spacer sleeves 54 and 56 disposed on the rod 52 on opposite sides of the stop member 50, as particularly shown in FIG. 4. A plurality of spaced aperatures 56 are provided in the bracket 18 spaced from the apertures 46, and a plurality of similar spaced apertures 58 are provided in the bracket 20 in alignment with the apertures 56 whereby the rod 52 may be inserted through a preselected pair of aligned apertures 56 and 58 for positioning the stop member 50 at the desired location for limiting the movement of the tube 24 in one direction during operation of the apparatus 10 as will be hereinafter set forth. Of course, the rod 52 may be secured in position by a suitable wing nut 60, or the like, as is well known.

Of course, a protective flange 62 may be provided at the outer extremity of the arm 14 oppositely disposed from the yoke member 16 and interposed between the outer edges of the brackets 18 and 20, if desired, and as shown in the drawings.

A trigger mechanism generally indicated at 64 is pivotally secured to the tube 24 in any suitable manner and comprises a semi-circular arm member 66 having a latch or trigger member 68 extending radially outwardly from one end thereof, and a fish line receiving arm member 70 extending radially outwardly from the opposite end thereof. The trigger member 68 is pivotally secured at 72 between a pair of spaced flanges 74 rigidly secured to the outer periphery of the tube 24 whereby the trigger mechanism 64 may be pivotally connected with the tube 24. The trigger member 68 is provided with notched member 76 (FIG. 2) for releasable engagement with the sear 23 in the latched or engaged position of the trigger mechanism 64 as shown in broken lines in FIG. 2 and as will be hereinafter set forth.

A rod member 78 is rigidly secured to the outer extremity of the fish line receiving arm 70 in any suitable manner and extends axially outwardly therefrom for supporting a plurality of resilient line roller members 80 journalled in end to end relationship thereon. An end cap member 82, or the like, may be threadedly secured to the outer end of the rod 78 for securing the roller members 80 in position thereon. Of course, the roller members 80 may be individual elements, or may be of a unitary construction, as desired, and are provided for selectively receiving the fish line 84 therearound. It will be apparent that the distance between the pivot point 72 and the position of the line 84 around the rollers 80 will provide a leverage for determining the sensitivity of the operation of the trigger mechanism 64, as will be hereinafter set forth.

A plurality of apertures 86 are longitudinally spaced along the arm 70 between the circular member 66 and rollers 80 for selectively receiving one end of a tension spring 88 therein. A spring rack member 90 is rigidly secured to the outer periphery of the tube 24 in the proximity of the arm 70 and is provided with a plurality of spaced recesses or notches 92 for selectively receiving the opposite end of the spring 88 therein. It will be apparent that the selection of the aperture 86 and notch 92 will determine the pressure or force applied to the arm 70 for urging the arm 70 in a direction toward the rack member 90, and thus determine the force or pressure required for releasing the trigger mechanism 64 from the engaged position thereof, as will be hereinafter set forth.

Substantially any type clamping or securing mechanism may be adjustably secured to the support frame 12 for supporting the apparatus 10 in a stable position during use thereof. For example, a clamp member 94 may be adjustably secured to the support arm 14 by a shaft 96 extending through the slot 22 and a wing nut 98 cooperating with a washer 100 for securely clamping the clamp 94 in substantially any desired position along the length of the slot 22. The clamp 94 may be secured to the gunnel 102 of a boat, or the like, in the usual manner for securing the apparatus 10 thereto. Alternately, a stake or spade member (not shown) may be similarly secured to the support frame 12 for securing the apparatus 10 to the ground; or, if desired, suitable clamping means may be provided for securing apparatus to the oar lock (not shown) of the boat.

Figure 2:
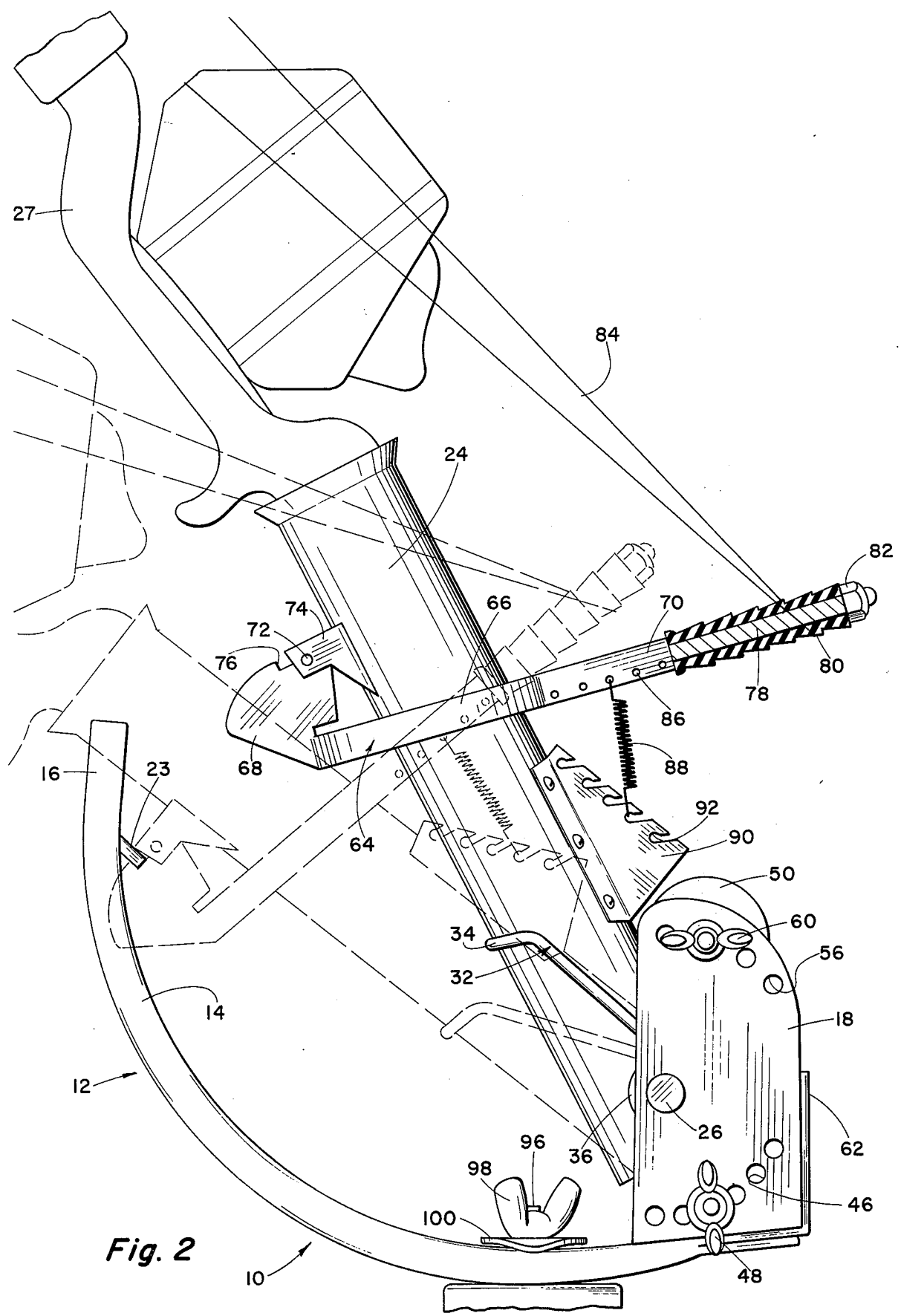
FIG. 2 is a side elevational view of a combined fishing rod holder and fish hook setter apparatus embodying the invention, with a released position thereof depicted in solid lines and a latched position thereof depicted in broken lines, and depicting a portion in section for purposes of illustration.

In use, the support frame 12 of the apparatus 10 may be securely supported in a stable position in any suitable manner, such as by clamping thereof to a portion of a boat, or the like, and one end of the fishing rod 27 may be inserted into the tube 24 as shown in FIG. 2. The fish line 84 may be manually placed around the line receiving element 70, with the line 84 being positioned around the desired line roller member 80, as shown in FIG. 2. It will be apparent that placing of the line 84 around the outermost member 80 will provide a maximum distance between the line and the pivot connection 72, and placing of the line 84 around the innermost member 80 will provide the minimum distance between the line and the pivot point 72, thus permitting a variation in the sensitivity of release action for the engaged trigger mechanism 64.

The tube 24 may be manually moved toward the frame 12 against the force of the dual torsion spring 32 for disposition thereof within the yoke 16 and for engaging the notch 76 with the sear 23 as shown in broken lines in FIG. 2. This latches the tube 24 to the support frame 12 for supporting the fishing rod 27 until such time that a fish (not shown) strikes the bait (not shown) carried by the fish line 84 in the usual manner. When the fish strikes the bait, a force or pressure is applied to the line 84 for pulling the line 84 in a direction away from the apparatus 10. This force on the line 84 pulls the line receiving element 70 in a direction away from the spring rack member 90, and pivots the latch or trigger member 68 in a counterclockwise direction about the pivot point 72 as viewed in the drawings whereby the notch 76 is released from the engagement with the sear 23. As soon as the trigger mechanism 64 is thus released from the latched position thereof, the dual torsion spring 32 snaps the tube 24 and rod 27 in a direction away from the support arm 14, and simultaneously "jerks" the line 84 for quickly and efficiently setting the fish hook (not shown) in the mouth of the fish. The force with which the tube 24 and rod 27 are moved by the spring 32 is established by the position of the rod 44 against the spring ends 40 and 42 as hereinbefore set forth. In addition, the movement of the tube 24 and rod 27 is limited by the engagement of the tube 24 with the stop member 50. Of course, the positon of the stop member 50 may be varied by placing the rod 52 through substantially any desired aligned pairs of apertures 56 and 58, as hereinbefore set forth. Furthermore, the force required for releasing the trigger mechanism 64 by the line 84 may be varied by selecting substantially any of the apertures 86 for receiving one end of the spring 88, and substantially any of the recesses 92 for receiving the opposite end thereof.

It will be readily apparent that the variety of adjustments possible for the actuation of the trigger mechanism 64, and for the release pressure applied to the tube 24 by the spring 32, and for the limit of released movement for the tube 24 provides a great versatility for the use of the apparatus 10. When the apparatus is to be utilized for supporting a fishing rod 27 used for catching fish having very delicate mouths, or the like, the dual torsion spring 32 may be adjusted to provide a relatively light force on the tube 24 for reducing the force applied on the line 84 in setting the fish hook in the mouth of the fish. Conversely, if a fish is being caught which requires a great force for setting of the fish hook, then the spring 32 may be properly adjusted for transmitting a relatively strong or great force to the rod 27 and line 84 as required for efficiently setting the fish hook.

It should be further noted that the trigger member 68 may be balanced, as viewed in the drawings, to provide a clockwise torque due to the weight of the line receiving element 70 whereby the setting or engagement of the notch 76 with the sear 23 may be accomplished without the use of the spring 88.

From the foregoing it will be apparent that the present invention provides a novel combined fish rod holder and fish hook setter apparatus wherein a rod receiving tube member is pivotally secured to a support apparatus which may be readily anchored or secured to a stable support structure during use of the apparatus. A trigger mechanism is carried by the tube member and engagable with the support apparatus for retaining the tube member and fish rod in a pressurized position during a fishing operation. A line receiving element is carried by the trigger mechanism and is responsive to pressure from a "strike" of a fish for releasing the trigger mechanism in order that the rod and rod holder may be quickly moved about a pivot axis for efficiently setting the hook in the mouth of the fish. The force required for releasing the trigger mechanism, and the force required for moving the released rod holder may be varied to provide a substantially universal use for the apparatus. In addition, adjustable stop means is provided for limiting the movement of the rod holder in the releasing operation for providing further versatility for the apparatus. The novel apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A combination fishing rod holder and fish hook setter apparatus comprising support frame means, tubular means pivotally secured to the support frame means for receiving one end of the fishing rod therein, trigger means having a pivot point carried by the tubular means and pivotally secured thereto for releasable engagement with the support frame means to provide a pressurized latch position for the tubular means in one position thereof, said trigger means pivot point being offset so that the trigger means is urged by gravity toward a latch position, adjustable dual torsion spring means provided on the support frame means for applying preselected pressure on the tubular means in the latched thereof, fish line receiving means carried by the trigger means and responsive to pressure of the fish line thereagainst for releasing the trigger means from the engaged position thereof with the support frame means, and wherein said support frame means is provided with a nonmovable sear means for engagement with the trigger means to provide said engaged position thereof with the support means and wherein said trigger means is provided with a sear follower portion for guiding the trigger into a latched position with respect to the sear, and wherein said trigger means comprises a semi-circular portion concentric with and spaced from the outer periphery of the tubular means, a trigger member extending radially outwardly from one end of the semi-circular portion and pivotally secured to the tubular means for selective engagement with the support frame means sear means, a line receiving element extending radially outwardly from the opposite end of the semi-circular portion for receiving a portion of the fish line therearound whereby pressure on the fish line is transmitted to the trigger member for releasing the engagement thereof with the support frame means, and tension spring means is adjustably secured between the fish line receiving element and the tubular member for varying the fish line pressure required for release of the trigger member from engagement with the support frame means.

2. A combination fishing rod holder and fish hook setter apparatus as set forth in claim 1 wherein notch means is provided on said trigger member adjacent said sear follower portion for releasable engagement with the support frame means.

3. A combination fishing rod holder and fish hook setter apparatus as set forth in claim 1 wherein spring rack means is secured to the outer periphery of the tubular member for adjustably receiving one end of the tension spring means therein to provide said pressure adjustment for actuation of the trigger means.

4. A combination fishing rod holder and fish hook setter apparatus comprising support frame means, tubular means pivotally secured to the support frame means for receiving one end of the fishing rod therein, trigger means having a pivot point carried by the tubular means and pivotally secured thereto for releasable engagement with the support frame means to provide a pressurized latch position for the tubular means in one position thereof, said trigger means pivot point being offset so that the trigger means is urged by gravity toward a latch position, adjustable dual torsion spring means provided on the support frame means for applying preselected pressure on the tubular means in the latched position thereof, fish line receiving means carried by the trigger means and responsive to pressure of the fish line thereagainst for releasing the trigger means from the engaged position thereof with the support frame means, and including stop means carried by the support frame means, said stop means comprising a padded member radially adjustable with respect to the pivot axis of the tubular means and engageable therewith for limiting the movement of the tubular means in one direction upon release of the trigger means.

5. A combination fishing rod holder and fish hook setter apparatus comprising support frame means, tubular means pivotally secured to the support frame means for receiving one end of the fishing rod therein, trigger means carried by the tubular means and pivotally secured thereto for releasable engagement with the support frame means to provide a pressurized latch position for the tubular means in one position thereof, adjustable dual torsion spring means provided on the support frame means for applying preselected pressure on the tubular means in the latched position thereof, fish line receiving means carried by the trigger means and responsive to pressure of the fish line thereagainst for releasing the trigger means from the engaged position thereof with the support frame means, and wherein the support frame means is provided with sear means for engagement with the trigger means to provide said engaged position thereof with the support frame means, wherein the trigger means comprises a semi-circular portion concentric with and spaced from the outer periphery of the tubular means, a trigger member extending radially outwardly from one end of the semi-circular portion and pivotally secured to the tubular means for selective engagement with the support frame means, a line receiving element extending radially outwardly from the opposite end of the semi-circular portion for receiving a portion of the fish line therearound whereby pressure on the fish line is transmitted to the trigger member for releasing the engagement thereof with the support frame means, and tension spring means is adjustably secured between the fish line receiving element and the tubular member for varying the fish line pressure required for release of the trigger member from engagement with the support frame means, and wherein line roller means is journalled on the fish line receiving means for receiving the fish line therearound.

* * * * *